(12) United States Patent
Shiomi

(10) Patent No.: US 7,872,630 B2
(45) Date of Patent: Jan. 18, 2011

(54) LIQUID CRYSTAL DISPLAY

(75) Inventor: Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1207 days.

(21) Appl. No.: 10/828,471

(22) Filed: Apr. 21, 2004

(65) Prior Publication Data

US 2004/0207588 A1 Oct. 21, 2004

(30) Foreign Application Priority Data

Apr. 21, 2003 (JP) ............................. 2003-115784

(51) Int. Cl.
G09G 3/36 (2006.01)
(52) U.S. Cl. ..................... 345/101; 345/214; 349/72
(58) Field of Classification Search .................. 345/87, 345/214, 101; 349/72
See application file for complete search history.

(56) References Cited

U.S. PATENT DOCUMENTS

| | | | | |
|---|---|---|---|---|
| 5,027,111 | A * | 6/1991 | Davis et al. ................. | 345/101 |
| 5,694,147 | A * | 12/1997 | Gaalema et al. ............. | 345/101 |
| 6,943,768 | B2 * | 9/2005 | Cavanaugh et al. ......... | 345/101 |
| 7,106,287 | B2 * | 9/2006 | Ham ............................. | 345/89 |
| 2002/0033789 | A1 | 3/2002 | Miyata et al. | |
| 2002/0140652 | A1 | 10/2002 | Suzuki et al. | |

FOREIGN PATENT DOCUMENTS

| | | |
|---|---|---|
| JP | 5-173153 | 7/1993 |
| JP | 2650479 | 5/1997 |
| JP | 2002-311416 | 10/2002 |
| KR | 2001-0045560 | 5/2001 |
| KR | 2002-0028781 | 4/2002 |

OTHER PUBLICATIONS

Cited in Chinese Patent Office Action mailed Dec. 23, 2005 re: Chinese Patent Application No. 200410035157.4.
Cited in Korean Patent Office Action mailed Feb. 1, 2006 re: Korean Patent Application No. 10-2004-27015.

* cited by examiner

Primary Examiner—Amr Awad
Assistant Examiner—Michael Pervan
(74) Attorney, Agent, or Firm—Harness, Dickey & Pierce, P.L.C.

(57) ABSTRACT

A liquid crystal display of the present invention facilitates grayscale level transition from a previous frame to a current frame, in such a manner that a modulation driving process section reads out, from one look-up table, corrected image data corresponding to a combination of image data of a previous frame and image data of a current frame and then outputs this corrected image data, irrespective of the ambient temperature. Meanwhile, a temperature circuit controls a heater so as to either stop the heating by the heater when a temperature of the liquid crystal panel exceeds a threshold value which is 1° C. through 1.5° C. higher than a target temperature, or start the heating by the heater when the temperature of the liquid crystal panel goes below a threshold value which is 1° C. through 1.5° C. lower than the target temperature, the target temperature being determined in advance to be in a range between 48° C. and 63° C. In this manner, it is possible to realize a liquid crystal display which is simple in circuit arrangement but can improve a response speed while restraining the degradation of display quality to be hardly recognizable for the viewer.

24 Claims, 10 Drawing Sheets

FIG. 9

| 40 | TARGET GRAYSCALE LEVEL | | | | | | | | |
|---|---|---|---|---|---|---|---|---|---|
| | 0 | 32 | 64 | 96 | 128 | 160 | 192 | 224 | 255 |
| START GRAYSCALE LEVEL 0 | 0 | 62 | 112 | 142 | 160 | 189 | 210 | 240 | 255 |
| 32 | 0 | 32 | 79 | 122 | 146 | 182 | 207 | 237 | 255 |
| 64 | 0 | 21 | 64 | 106 | 138 | 176 | 203 | 235 | 255 |
| 96 | 0 | 16 | 54 | 96 | 132 | 171 | 200 | 233 | 255 |
| 128 | 0 | 11 | 47 | 89 | 128 | 167 | 198 | 231 | 255 |
| 160 | 0 | 7 | 39 | 80 | 118 | 160 | 195 | 228 | 255 |
| 192 | 0 | 5 | 34 | 74 | 111 | 155 | 192 | 226 | 255 |
| 224 | 0 | 2 | 28 | 65 | 99 | 149 | 186 | 224 | 255 |
| 255 | 0 | 1 | 24 | 58 | 95 | 145 | 181 | 222 | 255 |

FIG. 10

| 35 | TARGET GRAYSCALE LEVEL | | | | | | | | |
|---|---|---|---|---|---|---|---|---|---|
| | 0 | 32 | 64 | 96 | 128 | 160 | 192 | 224 | 255 |
| START GRAYSCALE LEVEL 0 | 0 | 72 | 132 | 157 | 175 | 197 | 214 | 241 | 255 |
| 32 | 0 | 32 | 87 | 130 | 153 | 187 | 209 | 238 | 255 |
| 64 | 0 | 17 | 64 | 110 | 141 | 179 | 205 | 236 | 255 |
| 96 | 0 | 10 | 49 | 96 | 133 | 173 | 201 | 234 | 255 |
| 128 | 0 | 5 | 41 | 86 | 128 | 168 | 199 | 232 | 255 |
| 160 | 0 | 3 | 31 | 75 | 115 | 160 | 195 | 229 | 255 |
| 192 | 0 | 2 | 25 | 65 | 105 | 154 | 192 | 227 | 255 |
| 224 | 0 | 1 | 19 | 53 | 91 | 147 | 185 | 224 | 255 |
| 255 | 0 | 0 | 12 | 44 | 81 | 140 | 179 | 221 | 255 |

FIG. 11

| 30 | TARGET GRAYSCALE LEVEL | | | | | | | | |
|---|---|---|---|---|---|---|---|---|---|
| | | 0 | 32 | 64 | 96 | 128 | 160 | 192 | 224 | 255 |
| START GRAYSCALE LEVEL | 0 | 0 | 80 | 136 | 164 | 183 | 201 | 216 | 241 | 255 |
| | 32 | 0 | 32 | 91 | 134 | 157 | 190 | 210 | 238 | 255 |
| | 64 | 0 | 15 | 64 | 112 | 143 | 181 | 206 | 236 | 255 |
| | 96 | 0 | 7 | 47 | 96 | 134 | 174 | 202 | 234 | 255 |
| | 128 | 0 | 2 | 38 | 85 | 128 | 168 | 199 | 232 | 255 |
| | 160 | 0 | 1 | 27 | 72 | 113 | 160 | 195 | 229 | 255 |
| | 192 | 0 | 1 | 21 | 61 | 102 | 153 | 192 | 227 | 255 |
| | 224 | 0 | 0 | 14 | 47 | 87 | 146 | 184 | 224 | 255 |
| | 255 | 0 | 0 | 6 | 37 | 74 | 137 | 178 | 221 | 255 |

FIG. 12

| 25 | TARGET GRAYSCALE LEVEL | | | | | | | | |
|---|---|---|---|---|---|---|---|---|---|
| | | 0 | 32 | 64 | 96 | 128 | 160 | 192 | 224 | 255 |
| START GRAYSCALE LEVEL | 0 | 0 | 88 | 144 | 172 | 191 | 206 | 219 | 242 | 255 |
| | 32 | 0 | 32 | 95 | 138 | 161 | 193 | 212 | 239 | 255 |
| | 64 | 0 | 13 | 64 | 115 | 145 | 183 | 207 | 237 | 255 |
| | 96 | 0 | 4 | 45 | 96 | 135 | 175 | 203 | 235 | 255 |
| | 128 | 0 | 0 | 36 | 84 | 128 | 169 | 200 | 233 | 255 |
| | 160 | 0 | 0 | 24 | 70 | 112 | 160 | 196 | 230 | 255 |
| | 192 | 0 | 0 | 17 | 57 | 99 | 153 | 192 | 228 | 255 |
| | 224 | 0 | 0 | 10 | 42 | 83 | 145 | 184 | 224 | 255 |
| | 255 | 0 | 0 | 1 | 30 | 68 | 135 | 177 | 221 | 255 |

FIG. 13

| 35 | TARGET GRAYSCALE LEVEL | | | | | | | | |
|---|---|---|---|---|---|---|---|---|---|
| | | 0 | 32 | 64 | 96 | 128 | 160 | 192 | 224 | 255 |
| START GRAYSCALE LEVEL | 0 | | 101.3 | 104.3 | 97.0 | 95.6 | 97.0 | 98.8 | 99.5 | 85.0 |
| | 32 | 96.6 | | 101.2 | 95.2 | 96.5 | 99.7 | 98.1 | 98.4 | 92.5 |
| | 64 | 98.3 | 101.4 | | 96.5 | 98.5 | 100.1 | 97.8 | 100.7 | 93.7 |
| | 96 | 98.9 | 99.3 | 102.6 | | 95.6 | 97.4 | 97.7 | 99.7 | 95.1 |
| | 128 | 99.1 | 99.4 | 98.2 | 100.8 | | 96.8 | 98.9 | 97.8 | 96.0 |
| | 160 | 99.2 | 100.3 | 99.0 | 103.6 | 99.5 | | 98.6 | 100.7 | 97.3 |
| | 192 | 98.8 | 100.0 | 98.5 | 103.3 | 100.7 | 103.3 | | 95.1 | 99.3 |
| | 224 | 99.0 | 99.6 | 100.0 | 103.3 | 99.7 | 101.4 | 100.2 | | 99.2 |
| | 255 | 99.0 | 99.7 | 99.7 | 100.9 | 98.4 | 102.7 | 102.0 | 101.6 | |

FIG. 14

| 40 | TARGET GRAYSCALE LEVEL | | | | | | | | |
|---|---|---|---|---|---|---|---|---|---|
| | | 0 | 32 | 64 | 96 | 128 | 160 | 192 | 224 | 255 |
| START GRAYSCALE LEVEL | 0 | | 87.6 | 87.6 | 85.0 | 79.4 | 87.7 | 93.8 | 99.5 | 84.8 |
| | 32 | 95.9 | | 90.2 | 87.7 | 81.8 | 91.6 | 93.6 | 98.3 | 92.7 |
| | 64 | 98.4 | 97.0 | | 86.7 | 86.7 | 91.4 | 98.0 | 101.2 | 94.1 |
| | 96 | 98.9 | 97.5 | 96.2 | | 92.0 | 93.4 | 97.6 | 99.8 | 95.4 |
| | 128 | 99.0 | 99.6 | 98.3 | 95.1 | | 92.8 | 94.9 | 97.7 | 95.9 |
| | 160 | 99.2 | 99.6 | 96.9 | 93.7 | 99.9 | | 87.1 | 100.5 | 97.2 |
| | 192 | 98.9 | 99.4 | 97.1 | 94.7 | 97.5 | 99.6 | | 95.0 | 98.4 |
| | 224 | 98.9 | 99.7 | 98.8 | 94.5 | 97.6 | 95.8 | 100.3 | | 97.6 |
| | 255 | 98.9 | 99.3 | 98.6 | 94.4 | 96.7 | 97.2 | 96.7 | 102.2 | |

LIQUID CRYSTAL DISPLAY

This Nonprofitional application claims priority under 35 U.S.C. §119(a) on Patent Application No. 2003/115784 filed in Japan on Apr. 21, 2003, the entire contents of which are hereby incorporated by reference.

FIELD OF THE INVENTION

The present invention relates to a liquid crystal display, and particularly relates to a liquid crystal display which realizes, with a simple circuit arrangement, an improved response speed while restraining the degradation of display quality on the occasion of the change of the ambient temperature to be hardly recognizable for the viewer.

BACKGROUND OF THE INVENTION

Liquid crystal displays driving with a relatively few amount of power are widely adopted to stationary devices as well as portable devices. In such liquid crystal displays, the characteristics concerning display quality, such as a response speed, vary as a temperature of a liquid crystal panel varies. To solve this problem, Patent Document 1 (Japanese Laid-Open Patent Application No. 5-173153/1993 (Tokukaihei 5-173153; published on Jul. 13, 1993)) discloses a liquid crystal display which is provided with a heater for causing the whole display panel to have a uniform temperature, in order to restrain the degradation of display quality.

Meanwhile, liquid crystal displays in general have a slower response speed than CRTs (Cathode-Ray Tubes) and other display devices. A response sometimes is not completed, because of a grayscale level transition, within a rewriting period of time (16.7 msec) that corresponds to an ordinary frame frequency (60 Hz). In view of the circumstances, a method is adopted in which a driving signal is modulated and driven so as to facilitate a transition from a previous current grayscale level to a current grayscale level, thereby improving the response speed. Note that a liquid crystal display adopting such a method is disclosed in FIG. 4 of Patent Document 2 (Japanese Patent No. 2650479; registered on Sep. 3, 1997).

For instance, in the case where a grayscale level transition from a previous frame FR(k−1) to a current frame FR(k) is carried out based on "rise" drive, a voltage is supplied to a pixel so as to facilitate the transition from a current grayscale level to a current grayscale level. More specifically, a voltage having a higher level than a voltage level indicative of an image data D(I, j, k) of the current frame FR(k) is supplied to a pixel.

As a result, when a grayscale level transition occurs, a brightness level of a pixel changes more rapidly, and reaches, in a shorter period of time, near a brightness level that corresponds to image data D(I, j, k) of the current frame FR(k), as compared to a brightness level in a case where a voltage level indicative of image data D(I, j, k) of the current frame FR(k) is supplied from the beginning. This ensures to improve the response speed of the liquid crystal display even when the response speed of the liquid crystal is slow.

However, as in Patent Document 2, such a liquid crystal display facilitating the grayscale level transition facilitates the grayscale level transition from the previous frame to the current frame by correcting image data regarding the current grayscale level of the pixel, so that the pixel receives corrected image data rather than the current image data. Thus, unless the grayscale level transition is appropriately facilitated, excess brightness due to overfacilitated grayscale level transition or poor brightness due to insufficiently-facilitated grayscale level transition may occur.

If, to properly facilitate the grayscale level transition irrespective of the change of the ambient temperature, look-up tables (LUTs) corresponding to respective temperatures are provided, the number of the LUTs for circuits facilitating the grayscale level transition is increased, causing the circuit arrangement to be complicated.

Meanwhile, when a heater is adopted as in Patent Document 1, circuits for, e.g. estimating a temperature and controlling heating by stages have to be provided in order to highly precisely control a temperature (e.g. in a range of about ±1° C.), and this complicates the heater and a temperature control circuit for controlling the heater. Furthermore, even with these estimation circuit and control circuit, when the ambient temperature changes more than anticipated, the temperature control circuit increases a quantity of heat to be significantly larger than a usual quantity, in order to cancel out the change of the ambient temperature. In this case, the attempt to precisely control the temperature by the estimation circuit and control circuit could result in an unnecessarily high temperature of the liquid crystal panel, due to, for instance, mis-estimation.

In a structure of facilitating the grayscale level transition as in Patent Document 2, corrected image data rather than current image data is applied to a pixel. On this account, when a temperature of the liquid crystal panel is unnecessarily high, the grayscale level transition is overfacilitated so that the excess brightness occurs, and this causes significant degradation of display quality.

In light of this problem, the inventors of the present invention have found that a liquid crystal display facilitating a grayscale level transition is different from typical liquid crystal displays, to the extent that highly-precise control of a temperature does not always result in the prevention of the degradation of display quality. The objective of the present invention is thus to provide a liquid crystal display which realizes, with a simple circuit arrangement, an improved response speed while restraining the degradation of display quality on the occasion of the change of the ambient temperature to be hardly recognizable for the viewer.

SUMMARY OF THE INVENTION

The present invention was done to solve the above-identified problems, following the finding that, being different from typical liquid crystal displays, a liquid crystal display facilitating grayscale level transition has such a characteristic that highly-precise control of a temperature does not always result in the prevention of the degradation of display quality. The objective of the present invention is thus to provide a liquid crystal display which realizes, with a simple circuit arrangement, an improved response speed while restraining the degradation of display quality on the occasion of the change of the ambient temperature to be hardly recognizable for the viewer.

To achieve the above-described objective, a liquid crystal display of the present invention comprises: a memory storing, until a next time, current data indicating current brightness of each pixel provided in a liquid crystal panel; a look-up table precedently storing (i) combinations of previous data and the current data, the combinations having possibilities to be inputted, and (ii) output signals corresponding to the respective combinations; control means for outputting an output signal as corrected current data in order to facilitate grayscale level transition from a previous time to a current time, by reading out, from the look-up table, data corresponding to a combination of previous data read out from the memory and current data, and outputting that data or that data after being interpolated, instead of the current data; a heater heating the liquid crystal panel; and heater control means for controlling start and stop of heating by the heater, in such a manner as to keep a temperature of the liquid crystal panel to be not more than ±3° C. of a predetermined target temperature which is within a range between 33° C. and 63° C.

When a temperature of the liquid crystal panel is below 30° C., a grayscale level of the pixel does not properly transit even if the grayscale level transition from the further previous time to the previous time has been facilitated. For this reason, the grayscale level of the pixel may not reach a target grayscale level. In this case, if the grayscale level transition from the previous time to the current time is facilitated in the same manner as the grayscale level transition from the further previous time to the previous time, the facilitation may be excessive and cause excess brightness of the pixel or the facilitation may be insufficient and cause poor brightness of the pixel. The occurrence of this problem can be prevented by including, in the control means, (i) a circuit for determining whether or not the grayscale level transition from the further previous time to the previous time corresponds to certain grayscale level transition which causes the problem, and (ii) a circuit for adjusting the degree of the grayscale level transition facilitation, in accordance with the result of the determination. However, providing these circuits complicates the circuit arrangement of the control means.

In the meantime, in the above-described liquid crystal display, the target temperature of the temperature control of the liquid crystal panel carried out by the heater control means is determined in advance at not less than 33° C., so that the temperature of the liquid crystal panel is kept to be not less than 30° C. For this reason, the occurrence of the excess brightness and poor brightness are prevented without providing the determining circuit and adjusting circuit.

Furthermore, the above-described heater control means controls the start and stop of heating by the heater, in such a manner as to keep a temperature of the liquid crystal panel to be not more than ±3° C. of the target temperature. Thus, an actually-reached brightness of the pixel is kept to be ±20% of a target brightness even if only one look-up table is adopted and the degree of the grayscale level transition facilitation is determined by the control means only with reference to the grayscale level of the previous time and the grayscale level of the current time.

Moreover, since the above-described heater control means controls the start and stop of heating by the heater, in such a manner as to keep a temperature of the liquid crystal panel to be not more than ±3° C. of the target temperature, it is unnecessary to provide circuits for estimating a temperature and for controlling heating by stages, which are required in a case where the temperature of the liquid crystal panel is controlled to be not more than ±1° C. of the target temperature. This prevents an unnecessarily high temperature of the liquid crystal panel, due to, for instance, mis-estimation, and excess brightness caused by this high temperature.

As a result, with a simple circuit arrangement, a liquid crystal display which can improve, irrespective of the ambient temperature, a response speed while restraining the degradation of display quality to be hardly recognizable for the viewer is realized.

For a fuller understanding of the nature and advantages of the invention, reference should be made to the ensuing detailed description taken in conjunction with the accompanying drawings.

BRIEF DESCRIPTION OF THE DRAWINGS

FIG. 9 shows a look-up table suitable for a case that a temperature of the liquid crystal display is kept at 40° C.

FIG. 10 shows a look-up table suitable for a case that a temperature of the liquid crystal display is kept at 35° C.

FIG. 11 shows a look-up table suitable for a case that a temperature of the liquid crystal display is kept at 30° C.

FIG. 12 shows a look-up table suitable for a case that a temperature of the liquid crystal display is kept at 25° C.

FIG. 13 shows transport factors when a temperature of the liquid crystal display is kept at 35° C. and the liquid crystal display is driven with a look-up table suitable for 35° C.

FIG. 14 shows transport factors when a temperature of the liquid crystal display is kept at 35° C. and the liquid crystal display is driven with a look-up table suitable for 40° C.

DESCRIPTION OF THE EMBODIMENTS

The following will describe an embodiment of the present invention with reference to FIGS. 1-12. A liquid crystal display 1 of the present invention realizes, with a simple circuit arrangement, an improved response speed while restraining the degradation of display quality on the occasion of the change of the ambient temperature to be hardly recognizable for the viewer.

Figure 1:
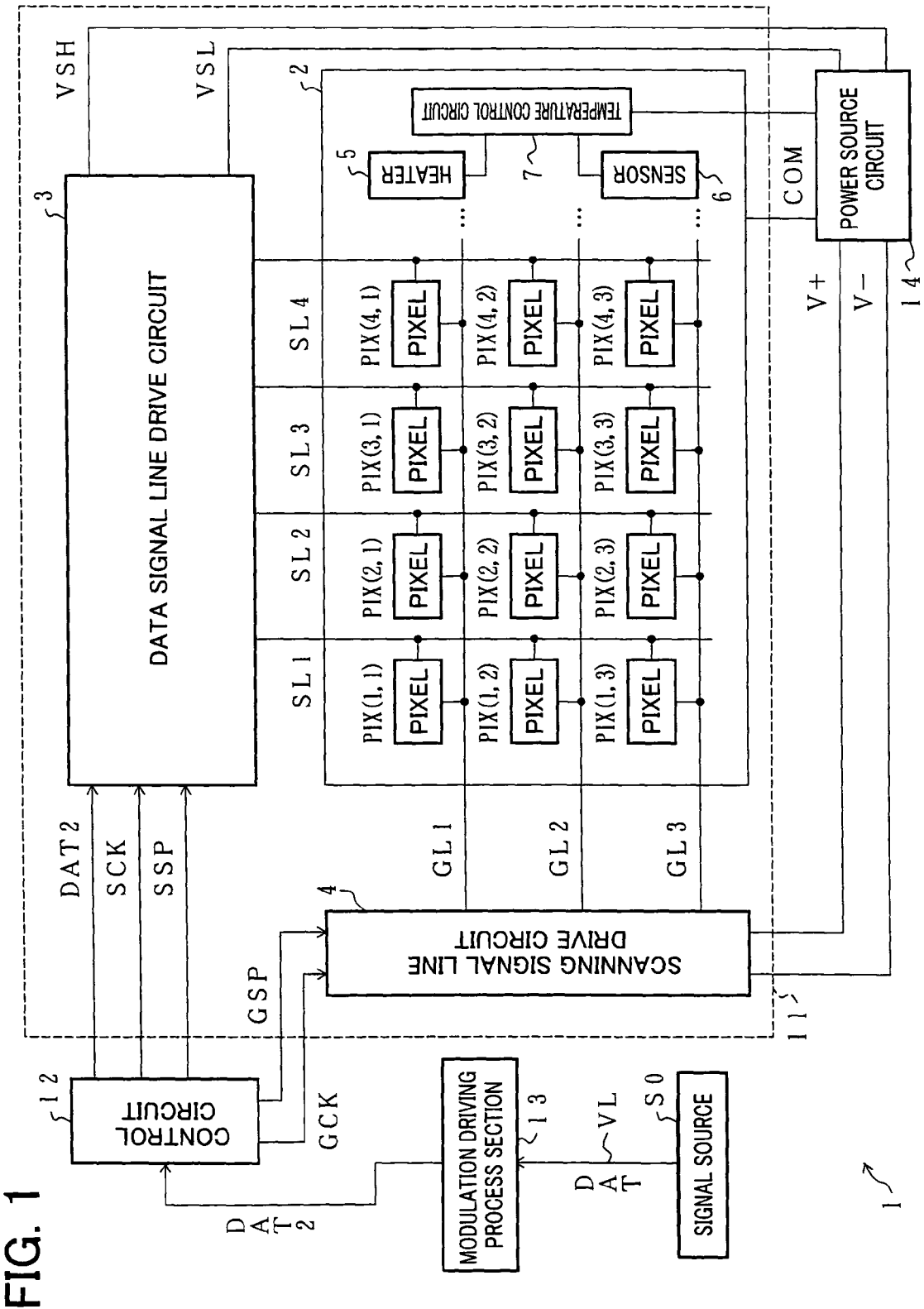
FIG. 1 relates to an embodiment of the present invention, and is a block diagram illustrating a substantial part of a liquid crystal display.

As FIG. 1 illustrates, a panel 11 of the liquid crystal display 1 includes a pixel array 2, data signal line drive circuit 3, scanning signal line drive circuit 4, heater 5, temperature sensor 6, and temperature control circuit (heater control means) 7. The pixel array 2 further includes pixels PIX (1, 1) through PIX (n, m) provided in a matrix manner. The data signal line drive circuit 3 drives data signal lines SL1-SLn of the pixel array 2, while the scanning signal line drive circuit 4 drives scanning signal lines GL1-GLm of the pixel array 2. The heater 5 heats the panel 11. The temperature sensor 6 senses a temperature of the panel 11. The temperature control circuit 7 controls the heater 5 in such a manner as to cause the temperature of the panel 11 to fall into a below-mentioned temperature range, in accordance with the temperature sensed by the temperature sensor 6.

The liquid crystal display 1 is further provided with a control circuit 12 and modulation driving process section 13. The control circuit 12 supplies control signals to the drive circuits 3 and 4. The modulation driving process section 13 modulates, in accordance with the supplied image signal, an image signal supplied to the control circuit 12 in such a manner as to facilitate the grayscale level transition. These circuits of the liquid crystal display 1 receive power from a power supply circuit 14.

For simplifying the description, in FIG. 1 the heater 5 is provided away from the pixel array 2. However, as later described with reference to FIG. 7, the heater 5 of the present embodiment is in reality provided so as to overlap the pixel array 2, when vertically looking down the panel 11. With this, the heater 5 can heat the whole pixel array 2.

Now, before describing the modulation driving process section 13, heater 5, and temperature control circuit 7 in detail, an outline of the liquid crystal display 1 and how this display 1 operates are explained. Note that, for the sake of simplicity, a number or alphabet for specifying a position, e.g. "i" in an i-th data signal line SLi is suffixed only when necessary, and such number or character is omitted when there is no need to specify a position or when a generic name is given.

The pixel array 2 includes a plurality of (n in the present case) data signal lines SL1-SLn and a plurality of (m in the present case) scanning signal lines GL1-GLm intersecting with the respective data signal lines SL1-SLn. Provided that an arbitrary integer between 1 and n is i and an arbitrary integer between 1 and m is j, the pixel array 2 has a pixel PIX(i, j) corresponding to an intersection of a data signal line SLi and a scanning signal line GLj.

In the present embodiment, the pixel PIX(i, j) is provided in an area circumscribed by two neighboring data signal lines SL(i−1) and SLi and two neighboring scanning signal lines GL(j−1) and GLj.

Figure 2:
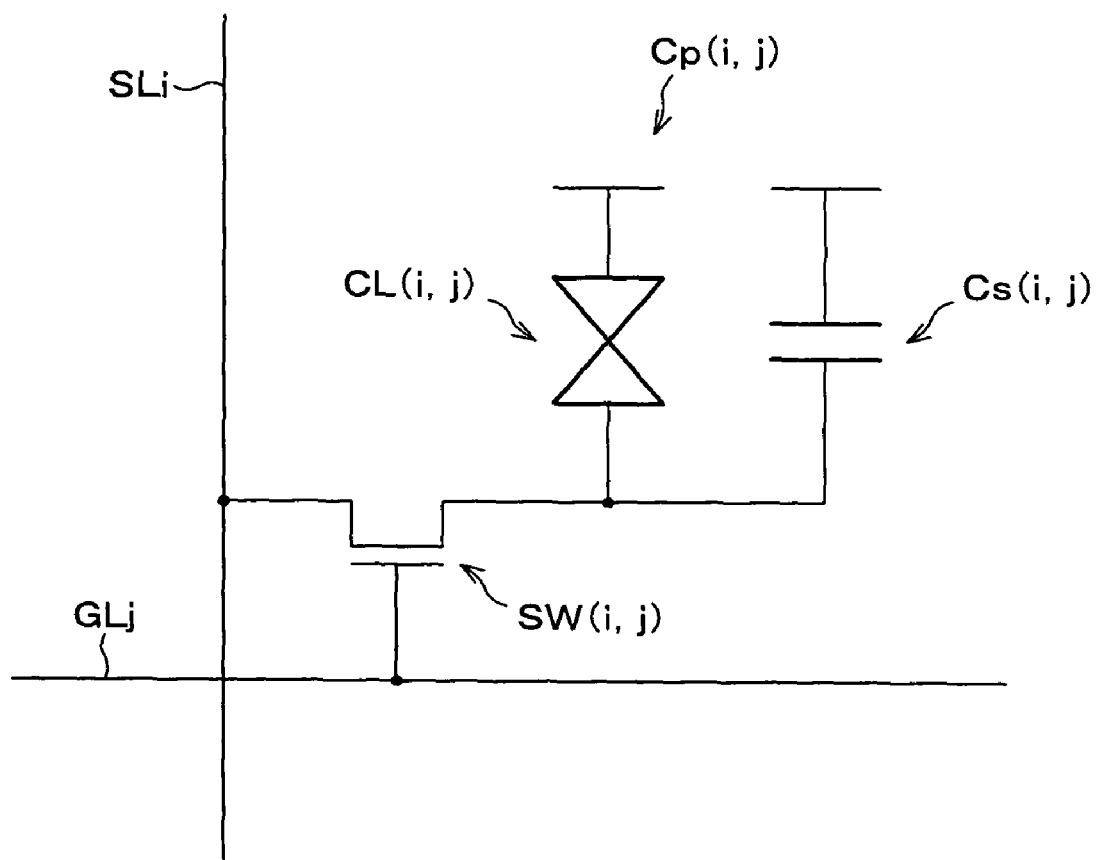
FIG. 2 is a circuit diagram illustrating an example of a pixel provided in the liquid crystal display.

As in FIG. 2, the pixel PIX(i, j) has, for instance, a field effect transistor SW(i, j) as a switching element and a pixel capacity Cp(i. j). The gate of the field effect transistor SW(i, j) is connected to the scanning signal line GLj, while the drain thereof is connected to the data signal line SLi. The source of the field effect transistor SW(i, j) is connected to one electrode (pixel electrode 121a which will be described later) of two electrodes of the pixel capacity Cp(i, j). The other electrode (opposing electrode 121b which will be described later) of the pixel capacity Cp(i, j) is connected to a common electrode line which is common to all of the pixels PIX. The pixel capacity Cp(i, j) is made up of a liquid crystal capacity CL(i, j) and, when necessary, an auxiliary capacity Cs(i, j).

In the pixel PIX(i, j), when the scanning signal line GLj is selected, the field effect transistor SW(i, j) turns on. This allows a voltage supplied to the data signal line SLi to be supplied to the pixel capacity Cp(i, j). In the meantime, when the selection of the scanning signal line GLj is finished, the field effect transistor SW(i, j) turns off. As long as the field effect transistor SW(i, j) turns off, the voltage at the time of turnoff is kept by the pixel capacity Cp(i, j). As the transmittance of liquid crystal varies in accordance with a voltage supplied to the liquid crystal capacity CL(i, j), the display condition of the pixel PIX(i, j) can be varied by selecting the scanning signal line GLj and supplying a voltage, which corresponds to image data D and has been supplied to the pixel PIX(i, j), to the data signal line SLi.

The liquid crystal display 1 of the present embodiment adopts a liquid crystal cell in vertical align mode. In this vertical align mode, liquid crystal molecules are aligned to be substantially orthogonal to the substrate when no voltage is applied, while, when a voltage is applied, the vertically-aligned liquid crystal molecules incline in accordance with the voltage applied to the liquid crystal capacity CL (i, j) of the pixel PIX (i, x). The liquid crystal display 1 adopts a liquid crystal cell in such vertical align mode, and the liquid crystal cell operates in normally black mode (the display appears dark under no voltage application).

Figure 4:
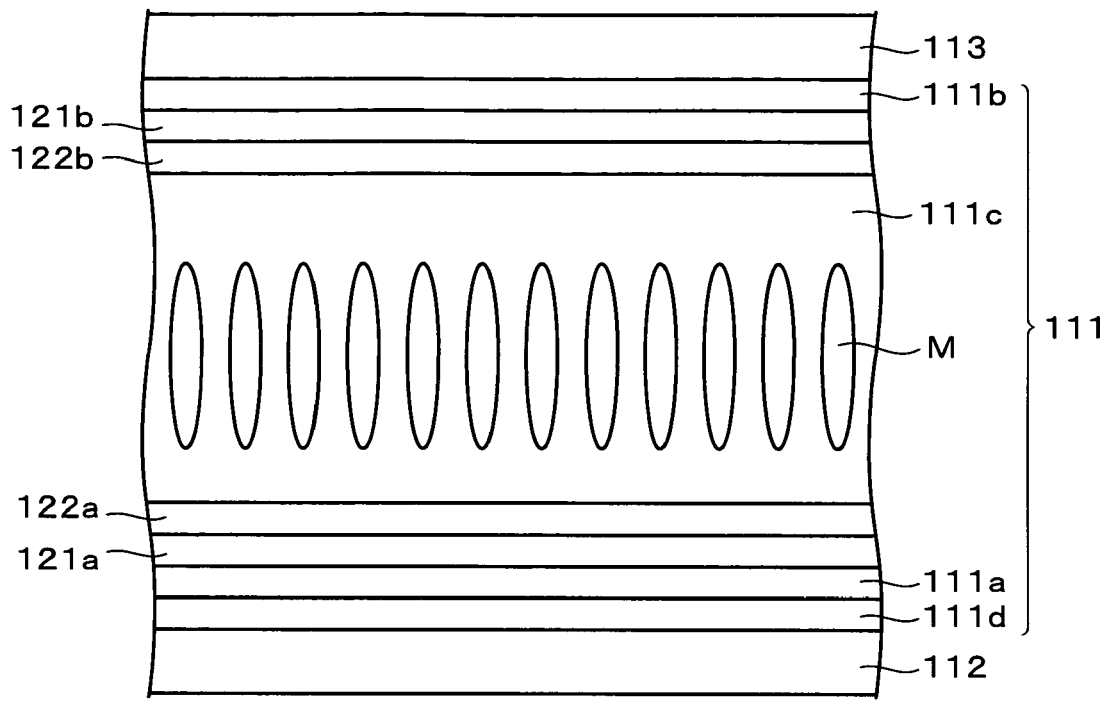
FIG. 4 is a schematic view, showing a liquid crystal cell provided in the liquid crystal display, to which no voltage is applied.

More specifically, as shown in FIG. 4, the pixel array 2 of the liquid crystal display 1 is constructed in such a manner that a vertically-aligned (VA) liquid crystal cell (liquid crystal display) 111 is sandwiched between polarization plates 112 and 113.

The liquid crystal cell 111 includes a TFT (Thin Film Transistor) substrate 111a, an opposing substrate 111b, and a liquid crystal layer 111c sandwiched between the substrates 111a and 111b. The TFT substrate 111a is provided with a pixel electrode 121a corresponding to each pixel PIX. The opposing substrate 111b is provided with an opposing electrode 121b. The liquid crystal layer 111c is made up of nematic liquid crystal having negative dielectric anisotropy. The liquid crystal display 1 can reproduce color images, so that the opposing substrate 111b has a color filter (not illustrated) corresponding to a color of each pixel PIX.

On the TFT substrate 111a, a vertical alignment film 122a is formed on the liquid crystal layer 111c side. Similarly, on the liquid crystal layer 111c side of the opposing substrate 111b, a vertical alignment film 122b is formed. With these films, the liquid crystal molecules M of the liquid crystal layer 111c are aligned to be substantially orthogonal to the surfaces of the substrates 111a and 1111b, when no voltage is applied between the electrodes 121a and 121b.

Figure 5:
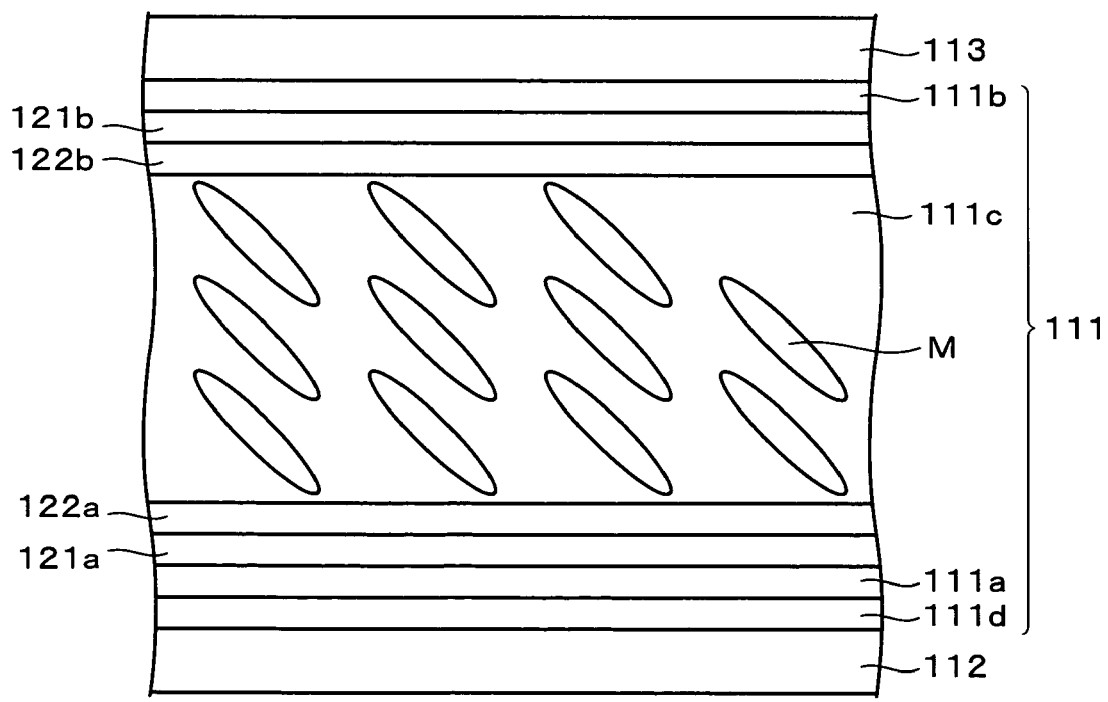
FIG. 5 is a schematic view, showing the liquid crystal cell provided in the liquid crystal display, to which a voltage is applied.

Meanwhile, when a voltage is applied between the electrodes 121a and 121b, the liquid crystal molecules M aligned to be along with the normal line direction of the substrates 11a and 111b (when no voltage is applied) incline at an angle corresponding to an applied voltage (see FIG. 5). Note that, since the substrates 11a and 111b face each other, normal directions and in-plane directions of the respective substrates will be simply referred to as "normal direction" and "in-plane direction", unless otherwise noted.

The liquid crystal cell 111 of the present embodiment is in a multiple-domain alignment. In the liquid crystal cell 111, each of the pixels PIX is divided into a plurality of domains, and controlled such that alignment directions differ from domain to domain. That is to say, directions (in-plane components of alignment directions) when the liquid crystal molecules M incline in response to an applied voltage are controlled.

Figure 6:
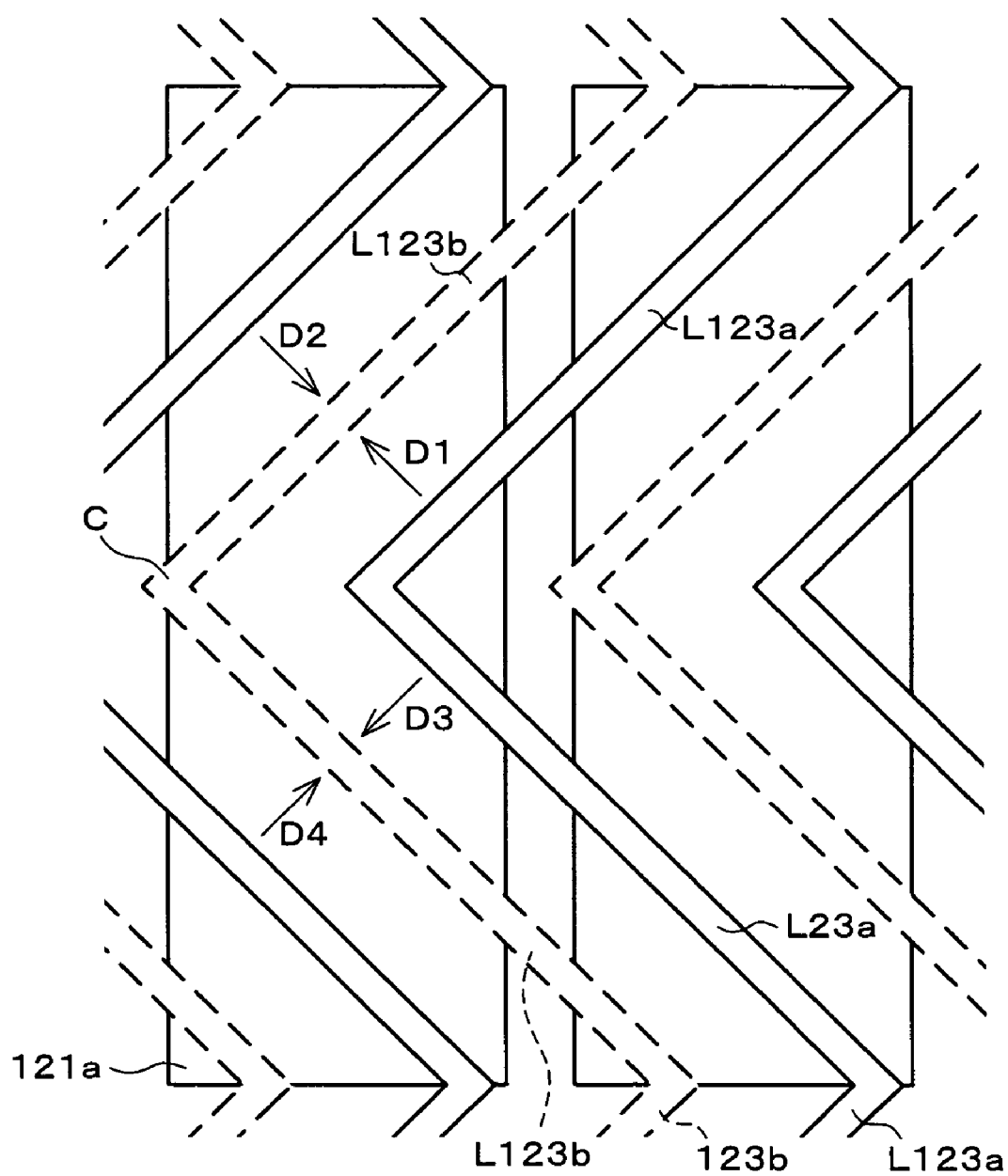
FIG. 6 relates to an example of the liquid crystal cell, and is a plan view illustrating the surrounding of pixel electrodes.

More specifically, as FIG. 6 shows, the pixel electrode 121a includes a sequence of projections 123a, provided in a stripe manner, that have a sectional shape of dancette and an in-plane shape of zigzag so as to bend at substantially a right angle. The opposed electrode 121b includes slits 123b (indicated by dotted lines in the figure), provided in a stripe manner, that have an in-plane shape of zigzag so as to bend at substantially a right angle. These slits 123b are opening sections where no electrode is formed. An interval between the sequence of the projections 123a and the slits 123b is set to a predetermined interval.

The sequence of projections 123a is formed by applying photosensitive resin onto the pixel electrode 121a and then fabricating the resin thus applied based on the photo lithography. The electrodes 121a and 121b are formed by forming ITO (Indium Tin Oxide) films on the substrates 11a and 111b and then applying photo resists onto the ITO films so as to expose, develop, and then etch electrode patterns, respectively. The slits 123b are formed by carrying out patterning so as to remove the areas corresponding to the slits 121b during forming of the opposed electrode 121b.

Note that, in the vicinity of the sequence of the projections 123a, during no voltage supply, the liquid crystal molecules align so as to be orthogonal to an oblique plane of the sequence of the projections 123a. Further, during supplying of the voltage, an electric field in the vicinity of the sequence of the projections 123a inclines so as to be parallel to the oblique plane of the sequence of the projections 123a. Since this causes each major axis of the liquid crystal molecules to incline in a direction that is perpendicular to the electric field, the liquid crystal molecules align in a direction oblique to the surface of the substrate. Further, because of the continuity of the liquid crystal, the liquid crystal molecules away from the oblique plane of the sequence of the projections 123a also align in a direction similar to that of the liquid crystal molecules in the vicinity of the oblique plane of the sequence of the projections 123a.

In like manner, during supplying of the voltage, an electric field, inclined to the surface of the substrate, is generated in the vicinity of an edge of the slits 123b, the edge indicating a boundary between the slits 123b and the opposed electrode 121b. This causes the liquid crystal molecules to align in a direction oblique to the surface of the substrate. Further, because of the continuity of the liquid crystal, the liquid crystal molecules away from the vicinity of the edge also align in a direction similar to that of the liquid crystal molecules in the vicinity of the edge.

Here, it is assumed in each of the sequence of the projections 123a and the slits 123b that a part between neighboring two corner parts C is referred to as a line part. In an area between a line part 123a of the sequence of the projections 123a and its neighboring line part 123b of the slits 123b, an in-plane component of the liquid crystal molecules in an alignment direction is, during the voltage supply, identical with that in a direction from the line part L123a toward the line part L123b.

Note that the corner part C in each of the sequence of the projections 123a and the slits 123b bends at substantially a right angle. This allows the alignment directions of the liquid crystal molecules are divided into four in the pixel PIX, thereby resulting in that domains D1 through D4 whose alignment directions of the liquid crystal molecules are different from each other are formed in the pixel PIX.

Meanwhile, the polarization plates 112 and 113 shown in FIG. 4 are disposed such that an absorption axis AA112 of the polarization plate 112 is orthogonal to an absorption axis AA113 of the polarization plate 113. Further, the polarization plates 112 and 113 shown in FIG. 4 are disposed such that the respective absorption axes AA112 and AA113 are at an angle of 45 degree with the in-plane components of the liquid crystal molecules in the alignment directions in the respective domains D1 through D4. Note that, in the example in FIG. 4, the absorption axis AA112 is in parallel to the figure and the absorption axis AA113 orthogonal to the absorption axis AA112 is orthogonal to the figure, as an example of the absorption axes AA112 and AA113 orthogonal to each other. However, it is possible to arrange these axes in such a manner that the absorption axis AA112 is orthogonal to the figure while the absorption axis AA113 is in parallel to the figure.

In the pixel array 2 described above, while a voltage is supplied between the pixel electrode 121a and the opposed electrode 121b, the liquid crystal molecules in the liquid cell 111, as shown in FIG. 5, align at an angle with the normal line direction of the substrate, the angle varying depending on the voltage thus supplied. This allows the light passing through the liquid crystal cell 111 to have a retardation that varies depending on the voltage thus supplied.

Note that the polarization plates 112 and 113 are disposed such that the absorption axis AA112 of the polarization plate 112 is orthogonal to the absorption axis AA113 of the polarization plate 113. This allows the light incident on a polarization plate on an outgoing side (for example, the polarization plate 112) to become elliptically polarized light that varies depending on the retardation caused by the liquid crystal cell 111, such that the incident light partially passes through the polarization plate 112. Thus, it is possible to control the outgoing light amount from the polarization plate 112 in response to the voltage thus supplied, and hence grayscale image reproduction is realized.

Further, in the liquid crystal cell 111, the domains D1 through D4 whose alignment directions of the liquid crystal molecules are different from each other are formed in the pixel. Accordingly, even though the liquid crystal molecules do not cause the transmitted light to have a retardation because of viewing the liquid crystal cell 111 from a direction that is parallel to the alignment direction of the liquid crystal molecules belonging to a domain (for example, the domain D1), the liquid crystal molecules in residual domains (here, the domains D2 through D4) can cause the transmitted light to have a retardation. This allows the respective domains to optically compensate for each other. As a result, it is possible to improve the display quality when obliquely viewing the liquid crystal cell 111, thereby ensuring to enlarge a viewing angle.

In contrast, while no voltage is supplied between the pixel electrode 121a and the opposed electrode 121b, the liquid crystal molecules in the liquid crystal cell 111, as shown in FIG. 4, are in vertically aligned state. At this state (i.e., when no voltage is supplied), the light incident on the liquid crystal cell 111 from the normal line direction has no retardation caused by the respective liquid crystal molecules, so as to pass through the liquid crystal cell 111 while keeping the polarization state. This causes the light incident on a polarization plate 112 on an outgoing side (here, for example, the polarization plate 112) to become linear polarized light whose polarization direction is substantially parallel to the absorption axis AA112 of the polarization plate 112, thereby resulting in that the light can not pass through the polarization plate 112. As a result, the pixel array 2 can display the black color.

Thus, in the pixel array 2 of the present embodiment, a voltage is supplied between the pixel electrode 121a and the opposed electrode 121b so as to cause an electric field whose direction is oblique to the surface of the substrate to be generated, thereby causing the liquid crystal molecules to obliquely align. Accordingly, it is possible to change the transmittance of the pixel PIX in accordance with a level of a voltage to be supplied to the pixel electrode 121a, thereby ensuring to carry out the grayscale display.

Meanwhile, the scanning signal line driving circuit 4 shown in FIG. 1 supplies a signal, such as a voltage signal, indicative of whether or not the scanning signal line is in a selection period to each of the scanning signal lines GL1 through GLm. The scanning signal line drive circuit 4 changes the scanning signal line GLj, to which such a signal is supplied, in accordance with, for example, a timing signal such as the clock signal GCK or the start pulse signal GSP that are supplied from the control circuit 12. This allows the respective scanning signal lines GL1 through GLm to be sequentially selected in response to a predetermined timing.

In response to a predetermined timing, the data signal line driving circuit 3 carries out a sampling of the image data D that are supplied to the respective pixels PIX in a time-sharing manner, so as to extract the image data D as an image signal DAT being thus sampled. The data signal line driving circuit 3 also supplies output signals that vary depending on the respective image data D to the respective pixels PIX(1, j) through PIX(n, j) corresponding to the scanning signal line GLj which the scanning signal line driving circuit 4 has selected, via the respective data signal lines SL1 through SLn.

Note that the data signal line drive circuit 3 determines the above sampling timing and the output timing of the output signal in accordance with the timing signals such as the clock signal SCK and the start pulse signal SSP that are supplied from the control circuit 12.

The pixels PIX(1, j) through PIX(n, j) control parameters such as transmittances and determine the brightness of them in accordance with the output signals to be supplied to corresponding data signal lines SL1 through SLn, respectively, while the corresponding scanning signal line GLj is selected.

Note that the scanning signal line driving circuit 4 sequentially selects the scanning signal lines GL1 through GLm. Accordingly, the entire pixels PIX(1, 1) through PIX(n, m) of the pixel array 2 can be set so as to have respective brightness which the respective image data D indicates, thereby enabling to update image to be displayed by the pixel array 2.

In the image display apparatus 1, an image signal DAT supplied from an image signal source S0 to the modulation driving process section 13 may be transmitted in frame (in entire screen unit). Alternatively, the image signal DAT may be transmitted for every plural fields into which one frame is divided. The following description deals with a case as an example where the image signal DAT is transmitted for every plural fields.

More specifically, in the present embodiment, the image signal DAT, supplied from the image signal source S0 to the modulation driving process section 13, is transmitted for every plural fields (for example, 2 fields) into which one frame is divided.

More concretely, when transmitting the image signal DAT to the modulation driving process section 13 of the image display apparatus 1 via an image signal line VL, the image signal source S0 transmits the entire image data for a specific field, and thereafter transmits an image data for the next field, for example. Thus, the image signal source S0 transmits image data for respective fields in a time-sharing manner.

The field is made of a plurality of horizontal lines. For example, in a specific field, via the image signal line VL, entire image data for a specific horizontal line are transmitted and thereafter image data for a horizontal line to be transmitted next are transmitted. Thus, the image data for the respective horizontal lines are transmitted in a time-sharing manner.

Note in the present embodiment that one frame is constituted by two fields. Image data of even-numbered horizontal lines are transmitted in respective even fields. Image data of odd-numbered horizontal lines are transmitted in respective odd fields. Further, when transmitting image data corresponding to the amount of one horizontal line, the image signal source S0 also drives the image signal line VL in a time-sharing manner. This allows the respective image data to be sequentially transmitted in a predetermined order.

Figure 3:
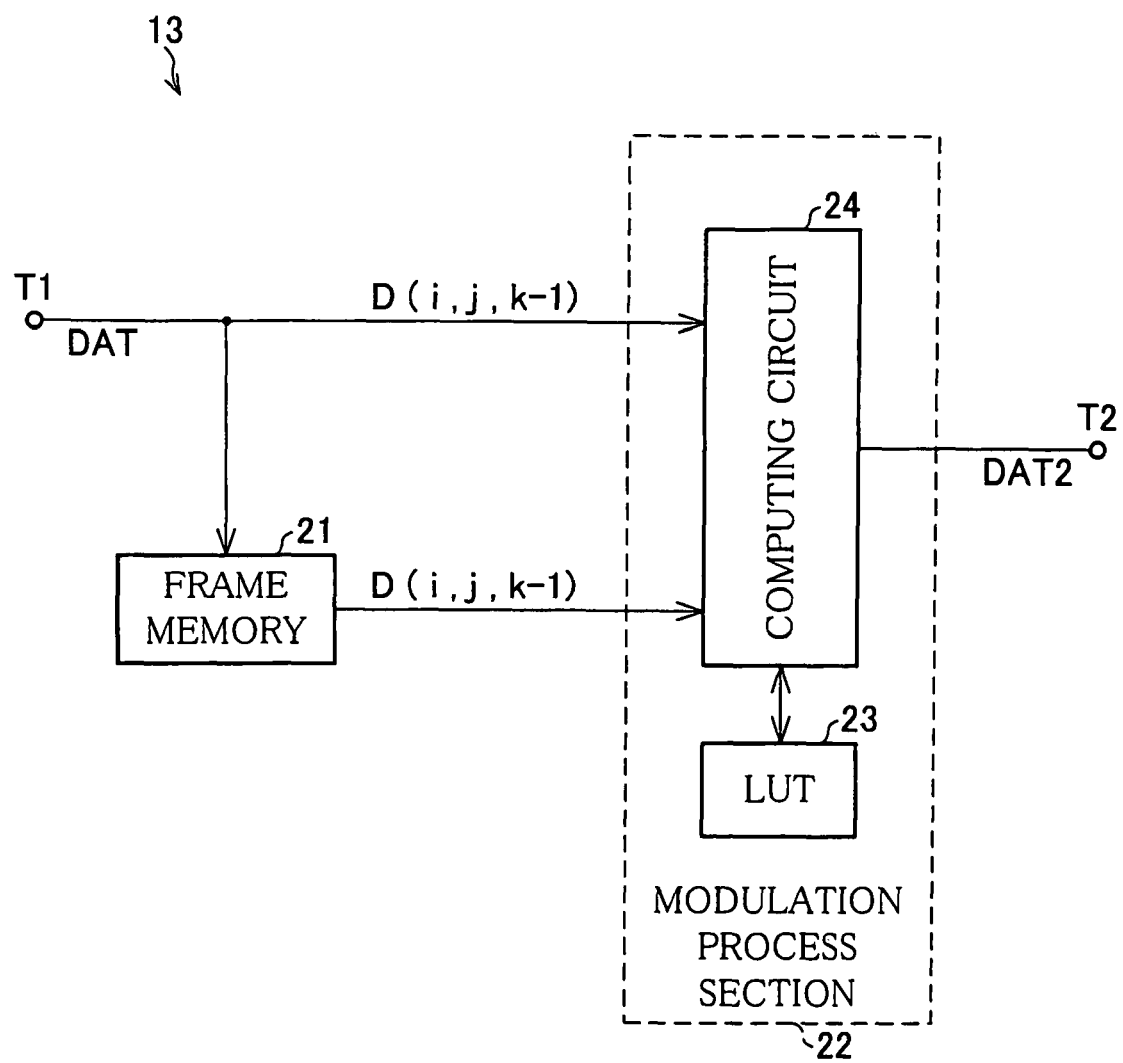
FIG. 3 is a block diagram illustrating a substantial part of a modulation driving process section provided in the liquid crystal display.

The modulation driving process section 13 of the present embodiment, as shown in FIG. 3, includes a frame memory (memory) 21 and a modulation process section 22. The frame memory 21 stores image data, corresponding to the amount of one frame, supplied via an input terminal T1.

The modulation process section 22 modulates image data D(i, j, k) of a current frame FR(k) supplied from the input terminal T1, so as to output corrected image data D2(i, j, k) being modulated. The modulation process section 22 corrects (modulates) the image data D(i, j, k) of the current frame FR(k) in such a manner as to facilitate the grayscale level transition between the image data D(i, j, k) and image data D(i, j, k−1) which belongs to the previous frame FR(k−1), is read out from the frame memory 21, and corresponds to the same pixel PIX(i, j) as the image data D(i, j, k), in accordance with the image data D(i, j, k) and image data D(i, j, k−1).

An image signal (correction image signal) DAT2 outputted from the modulation process section 22 is supplied to a control circuit 12 shown in FIG. 1. The control circuit 12 then supplies the image signal DAT2 to the data signal line drive circuit 3. In accordance with this correction image signal DAT2, the data signal line drive circuit 3 drives the respective pixels PIX(i, j).

The modulation process section 22 is further provided with a look-up table (LUT) 23. In the LUT 23, sets of corrected image data corresponding to respective combinations having possibilities to be inputted as the image data D(i, j, k) and image data D(i, j, k−1) have been stored in advance.

On this account, even if it is impossible with a small-scale circuitry to compute a formula for highly-accurately approximating sets of data corresponding to the respective combinations, the modulation process section 22, which can output highly-accurate data corresponding a combination of the image data D(i, j, k) and image data D(i, j, k−1) being supplied, can be realized with a small-scale circuitry.

Furthermore, in the present embodiment, the modulation process section 22 is provided with a computing circuit (control means) 24 in order to reduce a storage capacity required for the LUT 23. That is to say, the sets of corrected image data stored in the LUT 23 do not correspond to all of the above-described combinations but correspond to only predetermined combinations. The computing circuit 24 interpolates corrected image data corresponding to each combination stored in the LUT 23. Then the computing circuit 24 computes corrected image data D2(i, j, k) corresponding to the combination of the image data D(i, j, k−1) of the previous frame FR(k−1) and the image data D(i, j, k) of the current frame FR(k), thereby outputting the corrected image data D2(i, j, k) being computed.

As described later, the temperature control circuit 7 of the liquid crystal display 1 of the present embodiment uses the heater 5 and temperature sensor 6 and keeps a temperature of the panel 11 to be within ±3° C. of a target temperature, irrespective of the ambient temperature. To put it simply, the temperature control circuit 7 has a predetermined target temperature which is in the range between 48° C. and 63° C. When a temperature of the panel 11 exceeds a predetermined threshold value (1° C.-1.5° C.) of the target temperature, the temperature control circuit 7 causes the heater 5 to stop heating. Meanwhile, when a temperature of the panel 11 goes below a predetermined threshold value (1° C.-1.5° C.) of the target temperature, the temperature control circuit 7 causes the heater 5 to start heating. In this manner, the temperature of the panel 11 is always kept to be within ±3° C. of the target temperature, irrespective of the ambient temperature.

The modulation driving process section 13 is arranged so as to (i) read out, from one LUT 43, corrected image data for computing the corrected image data D2(i, j, k) corresponding to the combination of the image data D(i, j, k−1) of the previous frame FR(k−1) and the image data D(i, j, k) of the current frame FR(k), irrespective of the ambient temperature, and (ii) interpolates the corrected image data, and consequently computes the corrected image data D2(i, j, k). With such a simple arrangement, the modulation driving process section 13 can facilitate the grayscale level transition form the previous frame FR(k−1) to the current frame FR(k), without any problem.

Meanwhile, as shown in FIG. 4, the heater 5 of FIG. 1 in the liquid crystal cell 111 is made up of each transparent heater electrode 111*d* formed on one surface (in FIG. 4, the surface on the polarization plate 112 side) of one substrate (in FIG. 4, the TFT substrate 111a). The heater electrode 111d is, for instance, constituted by a transparent electrode such as ITO (Indium Tin Oxide), and generates heat in response to a voltage supply thereto, so that the panel 11 is heated.

Figure 7:
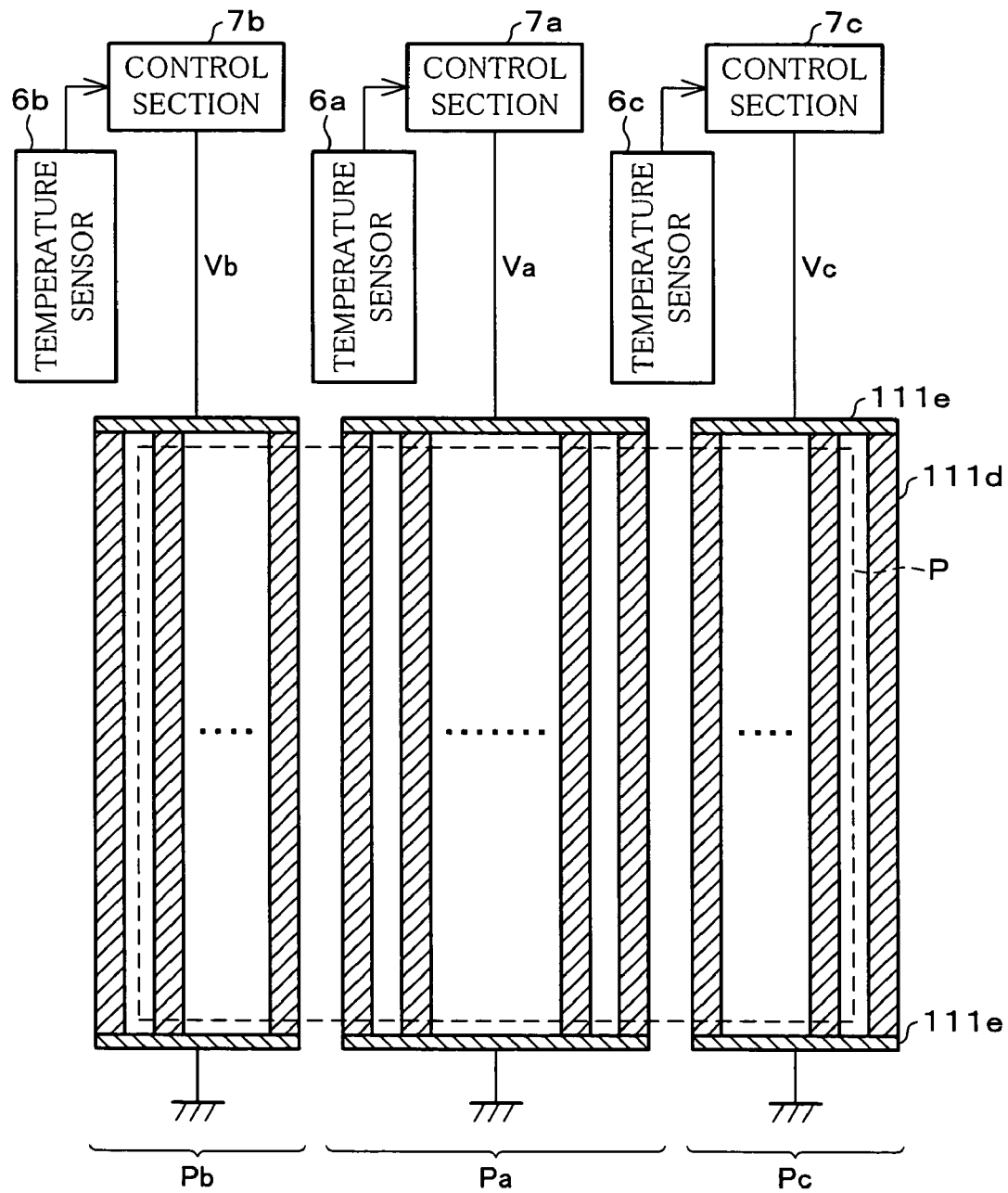
FIG. 7 is a plan view illustrating an example of a heater provided in the liquid crystal display.

As shown in FIG. 7, the heater electrodes 111d are formed like linear bands aligned to be in parallel to each other. It is preferable that these heater electrodes 111d are aligned to be in parallel to short sides of the panel 11, and the heater electrodes 111d and gaps therebetween cover the entire display screen P of the panel 11, when vertically looking down the panel 11.

In the present embodiment, the surface of the panel 11 is divided into at least three areas (in the example in FIG. 7, three areas Pa-Pc). The heater electrodes 111d in the central area Pa of the panel 11 are electrically connected to each other via metal electrodes 111e provided on the respective ends of each heater electrode 111d. Similarly, in each of the peripheral areas Pb and Pc of the panel 11, the heater electrodes 111d are electrically connected to each other via metal electrodes 111e provided on the respective ends of each heater electrode 111d.

The temperature control circuit 7 of the present embodiment is also provided with control sections 7a-7c corresponding to the respective areas Pa-Pc. The control sections 7b and 7c can supply, to the heater electrodes 111d of the peripheral areas Pb and Pc, a voltage higher than a voltage supplied to the heater electrodes 111d of the central area Pa. With this, the entirety of the panel 11 is kept at a substantially uniform temperature.

Furthermore, in the present embodiment, temperature sensors 6a-6c are provided for measuring temperatures of the respective areas Pa-Pc. When the result of measurement by each temperature sensor 6a-6c exceeds a predetermined first threshold value, the corresponding control section 7a-7c stops the voltage supply to the heater electrodes 111d. Meanwhile, when the result of measurement by each temperature sensor 6a-6c goes below a predetermined second threshold value, the corresponding control section 7a-7c starts to supply a voltage to the heater electrodes 111d. ON the color filter or the substrate 111a (111b), the temperature sensors 6a-6c are preferably provided in respective non-display areas corresponding to the areas Pa-Pc. With this, the heater 5 of the present embodiment can keep a temperature of the panel 11 to be substantially identical with a target temperature, irrespective of the change of the ambient temperature.

Figure 8:
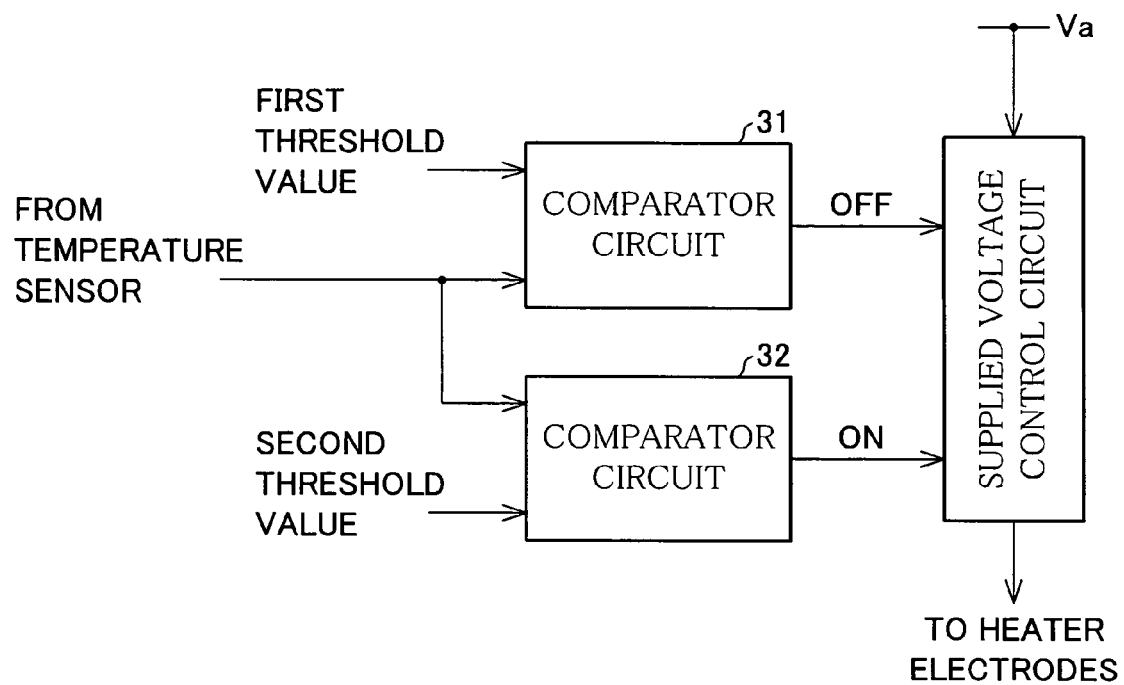
FIG. 8 is a block diagram illustrating an example of a temperature control circuit of the liquid crystal display.

As shown in FIG. 8, the control section 7a includes, for instance, a comparator circuit 31, comparator circuit 32, and supplied voltage control circuit 33. The comparator circuit 31 compares a first reference signal indicating the first threshold value with an output signal from the temperature sensor 6a, and determines whether or not the temperature of the panel 11 exceeds the first threshold value. The comparator circuit 32 compares a second reference signal indicating the second threshold value with an output signal from the temperature sensor 6a, and determines whether or not the temperature of the panel 11 is below the second threshold value.

The supplied voltage control circuit 33 starts to supply a voltage to the heater electrodes 11 id when the comparator circuit 32 determines that the temperature of the panel 11 is below the second threshold value, while stops the voltage supply to the heater electrodes 111d when the comparator circuit 31 determines that the temperature of the panel 11 exceeds the first threshold value. Note that, the remaining control sections 7b and 7c of the present embodiment are arranged in the same way as the control section 7a, except the connected temperature sensors and heater electrodes.

In the present embodiment, the above-mentioned target temperature is within the range between 48° C. and 63° C., the first threshold value is 1° C. through 1.5° C. higher than the target temperature, and the second threshold value is −1° C. through −1.5° C. lower than the target temperature.

On this account, the temperature control circuit 7 can keep the temperature of the panel 11 to be within ±3° C. of the target temperature, irrespective of the ambient temperature. Furthermore, since the temperature control circuit 7 keeps the temperature of the panel 11 to be within ±3° C. of the target temperature, the modulation driving process section 13 can facilitate the grayscale level transition without causing excess brightness even if the ambient temperature changes, with such a simple structure that data read out from one LUT 43 is interpolated and the corrected image data D2($i, k, k$) is computed. In this manner, irrespective of the ambient temperature, the modulation driving process section 13 can improve the response speed of the pixel PIX(i, j) while restraining the degradation of display quality to be hardly recognizable for the viewer.

Since the temperature of the panel 11 is controlled to be within ±3° C. of the target temperature, the temperature control circuit 7 can be realized with a relatively simple circuit arrangement such that the first and second threshold values are compared with the temperature of the panel 11, and the voltage supply to the heater 5 is started/stopped in accordance with the results of the comparisons. On the other hand, when the temperature of the panel 11 is controlled to be within ±1° C. of the target temperature, it is necessary to adopt such a complicated structure that a temperature of the panel 11 is estimated and the result of the estimation is reflected in the following control.

As a result, the liquid crystal display 1 which can improve, irrespective of the ambient temperature, the response speed while restraining the degradation of display quality to be hardly recognizable for the viewer is realized with a simple circuit arrangement.

More specifically, when a temperature of the panel 11 increases, the response speed inherent to the pixel PIX(i, j), i.e. the response speed with no facilitation of the grayscale level transition increases. This causes the grayscale level transition facilitation, which is necessary for reducing the response speed to a predetermined target value, to be less effective. On the other hand, when a temperature of the panel 11 decreases so that the response speed inherent to the pixel PIX(i, j) decreases, it is necessary to facilitate the grayscale level transition in a more intensive manner, in order to reduce the response speed to the target value.

In other words, provided that the degree of the grayscale level transition facilitation is fixed at a value suitable for a certain temperature (reference temperature), the grayscale level transition is excessively facilitated when the temperature of the panel 11 is higher than the reference temperature, so that excess brightness may occur. On the other hand, when the temperature of the panel 11 is lower than the reference temperature, the grayscale level transition is not sufficiently facilitated and the grayscale level of the pixel PIX(i, j) does not reach a target grayscale level, so that poor brightness may occur.

Assuming that the brightness of a start grayscale level is 0% and the brightness of the target grayscale level is 100%, the viewer of the liquid crystal display 1 is likely to notice the occurrence of poor brightness when the brightness of the pixel PIX(i, j) is less than 90%. Meanwhile, the viewer will notice the occurrence of excess brightness when the brightness of the pixel PIX(i, j) is more than 110%. For this reason, when the degree of the grayscale level transition facilitation is fixed to a certain value and the panel 11 is driven with one LUT 23, it is desired that the temperature change of the panel 11 is restrained in such a manner as to confine the error of the target grayscale level caused by the temperature change, i.e. the difference between the target transmittance (brightness) and the transmittance (brightness) obtained in the last one field, to be in the range of ±20%.

FIGS. 9-12 illustrate LUTs 23 suitable for the respective conditions that temperatures of the panel 11 are 40° C., 35° C., 30° C., and 25° C. Comparing these LUTs 23 with each other, the following has been found: When a temperature of the panel 11 changes for ±5° C. during a period in which grayscale level transition is liable to be noticed by the viewer (e.g. grayscale level transition to 128 or grayscale level transition from 128), an error of about 20% occurs in the brightness of the pixel PIX(i, j).

As an example, FIG. 13 shows transport factors when a temperature of the panel 11 is kept at 35° C. and the panel 11 is driven with an LUT 23 (shown in FIG. 10) suitable for the condition of 35° C. Meanwhile, FIG. 14 shows transport factors when a temperature of the panel 11 is kept at 35° C. and the panel 11 is driven with an LUT 23 (shown in FIG. 9) suitable for the condition of 40° C.

Note that the transport factors are calculated as: (brightness in the next field–start brightness)/(target brightness–start brightness). As the comparison between these figures clearly shows, when the panel 11 has a temperature of 35° C. but is driven with an LUT 23 for the condition of 40° C., there is a case where an error of the transport factor (i.e. deviation from 100%) excesses the above-mentioned permissible value (20%).

According to the measurements of transport factors in the temperature range of 40° C.-80° C., it is confirmed that, in the temperature range not less than 30° C., the above-mentioned error of the transport factor occurs without the occurrence of the below-mentioned trouble that the decay to grayscale level 32 is not properly carried out.

The characteristics of the panel 11 also fluctuate due to manufacturing variations. It has been found that, to confine the error of the transmittance (brightness), i.e. the difference between the target transmittance (brightness) and the transmittance (brightness) obtained in the last one field, to be in the range of ±20%, the temperature change has to be restrained in a range narrower than the range of ±5° C., i.e. in the range of 6° C. (±3° C.).

With this, even if the modulation process section 22 facilitates the grayscale level transition with only one LUT 23 and the degree of the grayscale level transition facilitation is fixed to a certain value, the temperature control circuit 7 can prevent the degradation of display quality by controlling the heater 5 to keep the temperature change of the panel 11 to be within the range of 6° C. (±3° C.).

In particular, in the temperature control circuit 7 of the present embodiment, the first threshold value is set so as to be 1° C. through 1.5° C. higher than the target temperature, and the second threshold value is set so as to be 1° C. through 1.5° C. lower than the target temperature. With these threshold values, the temperature control circuit 7 stops the heating by the heater 5 when the ambient temperature exceeds the first threshold value, while starts the heating by the heater 5 when the ambient temperature goes below the second threshold value. In this manner, such a simple structure can restrain the temperature change of the panel 11 to be within the range of 6° C. (±3° C.).

Moreover, the above-described temperature control circuit 7 controls the heater 5 in such a manner as to keep the temperature change of the panel 11 to be within the range of ±3° C. with respect to the target temperature. Thus, being different from the control to keep the temperature change to be within the range of ±1° C., it is unnecessary to provide circuits for estimating a temperature and for controlling heating by stages. This prevents the occurrence of an unnecessarily high temperature of the liquid crystal panel, due to, for instance, mis-estimation, and excess brightness caused by this high temperature.

As described above, when the temperature decreases so that the response speed inherent to the pixel PIX(i, j) decreases, it is necessary to carry out the grayscale level transition facilitation more intensely. However, since a maximum voltage applied to the pixel PIX(i, j) is limited by the capability of the power supply circuit 14, the grayscale level transition may not be sufficiently facilitated when the degree of necessary grayscale level transition facilitation is high.

In particular, the liquid crystal cell 111 of the present embodiment adopts a liquid crystal cell in vertical align mode. Such a liquid crystal cell in the vertical align mode is arranged such that the liquid crystal molecules with no voltage supply are aligned substantially vertical to the substrate, while the vertically-aligned liquid crystal molecules obliquely align in response to a voltage supplied to the liquid crystal capacity CL(i, j) of the pixel PIX(i, x). In the liquid crystal cell, for instance, the alignment direction of the liquid crystal molecules is caused to return to the vertical direction by the force of, for instance, the vertical alignment film. On this account, a response speed of reducing a grayscale level is often slower than a response speed of increasing a grayscale level, resulting in insufficient grayscale level transition facilitation.

In this manner, when the grayscale level transition from the previous frame to the current frame is facilitated without taking into consideration of the fact that the grayscale level transition from the further previous frame to the previous frame was not properly carried out, either the grayscale level transition is excessively facilitated and causes excess brightness or the gray scale level transition is not sufficiently facilitated and decreases the response speed. As a result, the display quality may be deteriorated.

The occurrence of this problem can be prevented by providing (i) a circuit for determining whether or not the grayscale level transition from the further previous frame to the previous frame causes the above-mentioned problem and (ii) a circuit for adjusting the degree of the grayscale level transition facilitation from the previous frame to the current frame, in accordance with the result of the determination. However, providing these circuits may complicate the circuit arrangement of the liquid crystal display 1.

The inventors of the present invention conducted diligent researches on how the degradation of display quality can be prevented without adopting the determining circuit and adjusting circuit, and it has been found that, in a case where the image data D(i, j, k) is reproduced with grayscale level 255 (8 bits), when the pixel PIX(i, j) accurately responses up to grayscale level 32, the viewer of the liquid crystal display 1 does not notice the degradation of display quality even if the determining circuit and adjusting circuit are not provided.

FIG. 11 shows an LUT 23 suitable for a case that a temperature of the panel 11 is 30° C., and FIG. 12 shows an LUT 23 suitable for a case that a temperature of the panel 11 is 25° C. In the following, the result of comparison between these LUTs are described. When a temperature of the panel 11 decreases to 25° C., the modulation process section 22 outputs the lowest grayscale level (0) on the occasion of decaying grayscale level transition from grayscale level 128 or 160 to grayscale level of 32. This modulation process section 22 cannot output a grayscale level lower than this, even on the occasion of decaying grayscale level transition from higher grayscale level (192, 224, or 255) to the grayscale level 32. This indicates that, when a temperature of the panel 11 decreases to 25° C., the modulation process section 22 cannot produce corrected image data D2(*i, j, k*) which allows the grayscale level transition from the above-mentioned grayscale levels to the grayscale level of 32 to be properly carried out.

Meanwhile, when a temperature of the panel 11 is kept at 30° C., FIG. 11 shows that the modulation process section 22 does not output the lowest grayscale level until grayscale transition from grayscale level 224 to grayscale level 32 is carried out. Even on the occasion of the grayscale transition from grayscale level 255 to grayscale level 32, the pixel PIX(i, j) can correctly reach the grayscale level 32 when the corrected image data D2(*i, j, k*) is grayscale level 0. Thus, when a temperature of the panel 11 is kept at not less than 30° C., the pixel PIX(i, j) can accurately respond to the decay grayscale level transition (grayscale level transition to a lower grayscale level) to the grayscale level of 32.

Thus, to produce corrected image data D2(*i, j, k*) which can accurately respond to the decaying grayscale level transition to grayscale level 32 by the modulation process section 22 without providing the determining circuit and adjusting circuit, it is desirable that the temperature control circuit 7 controls the heater 5 so as to cause the lower limit of a temperature of the panel 11 to be not less than 30° C. and the above-mentioned target temperature to be not less than 33° C.

When, as in the liquid crystal display 1 of the present embodiment, the panel 11 is heated by the heater 5, and without using a cooling system, naturally cooled by radiation (thermal-conduction) cooling, the panel 11 cannot be kept at a temperature lower than the ambient temperature of the panel 11. In general, a temperature of the panel 11 is higher than a temperature (ambient temperature) around the liquid crystal display 1, because of the heat from a heat source in the liquid crystal display 1, such as a backlight. For instance, when the ambient temperature is 30° C., a temperature around the panel 11 exceeds 40° C. For this reason, when the liquid crystal panel 1 is used in a place where an air temperature is more than 30° C., the lower limit of the temperature change is preferably not less than 45° C., and the target temperature is preferably not less than 48° C.

Meanwhile, the upper limit of the temperature control by the temperature control circuit 7 does not exceed a phase transition temperature (80° C.) of liquid crystal, and preferably not more than 66° C. in order to prevent the user of the liquid crystal display 1 from burning one's finger with the panel 11. Note that, however, since the power consumption of the heater 5 increases as the upper limit of the temperature increases, it is preferable that the target temperature is as low as possible on condition that the above-mentioned conditions are met.

The present invention was done to solve the above-identified problems, following the finding that a liquid crystal display facilitating grayscale level transition has such a characteristic that highly-precise control of a temperature does not always result in the prevention of the degradation of display quality. The objective of the present invention is thus to provide a liquid crystal display which realizes, with a simple circuit arrangement, an improved response speed while restraining the degradation of display quality on the occasion of the change of the ambient temperature to be hardly recognizable for the viewer.

To solve the above-identified problem, the liquid crystal display of the present invention, includes: a memory storing, until a next time, current data indicating current brightness of each pixel provided in a liquid crystal panel; a look-up table precedently storing (i) combinations of previous data and the current data, the combinations having possibilities to be inputted, and (ii) output signals corresponding to the respective combinations; and control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data, the liquid crystal display being characterized by including: a heater heating the liquid crystal panel; and heater control means for controlling start and stop of heating by the heater, in such a manner as to keep a temperature of the liquid crystal panel to be not more than ±3° C. of a predetermined target temperature which is within a range between 33° C. and 63° C., the number of the look-up table being one.

When a temperature of the liquid crystal panel is below 30° C., a grayscale level of the pixel does not properly transit even if the grayscale level transition from the further previous time to the previous time has been facilitated. For this reason, the grayscale level of the pixel may not reach a target grayscale level. In this case, if the grayscale level transition to the current time is facilitated in the same manner as the grayscale level transition from the further previous time to the previous time, the facilitation may be excessive and cause excess brightness of the pixel or the facilitation may be insufficient and cause poor brightness of the pixel. The occurrence of this problem can be prevented by including, in the control means, (i) a circuit for determining whether or not the grayscale level transition from the further previous time to the previous time corresponds to certain grayscale level transition causing the problem, and (ii) a circuit for adjusting the degree of the grayscale level transition facilitation, in accordance with the result of the determination. However, providing these circuits complicates the circuit arrangement of the control means.

In the meantime, in the above-described liquid crystal display, the target temperature of the temperature control of the liquid crystal panel carried out by the heater control means is determined in advance at not less than 33° C., so that the temperature of the liquid crystal panel is kept to be not less than 30° C. For this reason, the occurrence of the excess brightness and poor brightness are prevented without providing the determining circuit and adjusting circuit.

Furthermore, the above-described heater control means controls the start and stop of heating by the heater, in such a manner as to keep a temperature of the liquid crystal panel to be not more than ±3° C. of the target temperature. Thus, an actual brightness of the pixel is kept to be ±20% of a target brightness even if only one look-up table is adopted and the degree of the grayscale level transition facilitation is determined by the control means only with reference to the grayscale level of the previous time and the grayscale level of the current time.

Moreover, since the above-described heater control means controls the start and stop of heating by the heater, in such a manner as to keep a temperature of the liquid crystal panel to be not more than ±3° C. of the target temperature, it is unnecessary to provide circuits for estimating a temperature and for controlling heating by stages, which are required in a case where the temperature of the liquid crystal panel is controlled to be not more than ±1° C. of the target temperature. This prevents the occurrences of an unnecessarily high temperature of the liquid crystal panel, due to, for instance, misestimation, and excess brightness caused by this high temperature.

As a result, a liquid crystal display which can improve, irrespective of the ambient temperature, a response speed while restraining the degradation of display quality to be hardly recognizable for the viewer is realized with a simple circuit arrangement.

To solve the above-identified problem, the liquid crystal display of the present invention includes: a memory storing, until a next time, current data indicating current brightness of each pixel provided in a liquid crystal panel; a look-up table precedently storing (i) combinations of previous data and the current data, the combinations having possibilities to be inputted, and (ii) output signals corresponding to the respective combinations; and control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data, the liquid crystal display being characterized by comprising: a heater heating the liquid crystal panel; and heater control means for controlling the heater so as to either stop the heating by the heater when a temperature of the liquid crystal panel exceeds a threshold value which is 1° C. through 1.5° C. higher than a target temperature, or start the heating by the heater when the temperature of the liquid crystal panel goes below a threshold value which is 1° C. through 1.5° C. lower than the target temperature, the target temperature being determined in advance to be in a range between 33° C. and 63° C., the number of the look-up table being one.

The above-described heater control means controls the heater so as to either stop the heating by the heater when a temperature of the liquid crystal panel exceeds a threshold value (first threshold value) which is 1° C. through 1.5° C. higher than the target temperature, or start the heating by the heater when the temperature of the liquid crystal panel goes below a threshold value (second threshold value) which is 1° C. through 1.5° C. lower than the target temperature. Thus, the temperature of the liquid crystal panel is kept within ±3° C. of the target temperature, even if the ambient temperature of the liquid crystal panel changes. As a result, being similar to the above-described liquid crystal display, a liquid crystal display which can improve, irrespective of the ambient temperature, a response speed while restraining the degradation of display quality to be hardly recognizable for the viewer is realized with a simple circuit arrangement.

To solve the above-identified problem, the liquid crystal display of the present invention includes: a memory storing, until a next time, current data indicating current brightness of each pixel provided in a liquid crystal panel; a look-up table precedently storing (i) combinations of previous data and the current data, the combinations having possibilities to be inputted, and (ii) output signals corresponding to the respective combinations; and control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data, the liquid crystal display being characterized by comprising: a heater heating the liquid crystal panel; and heater control means for controlling start and stop of heating by the heater, in such a manner as to keep a difference between a temperature of the liquid crystal panel and a target temperature to be not more than a predetermined threshold value, the target temperature being a temperature at which, by facilitating the grayscale transition by the control means, each pixel is virtually able to reach a desired grayscale level in every grayscale level transition, the threshold value being set in such a manner as to keep a difference between a grayscale level at which a pixel reaches as a result of the grayscale level correction by the control means and a target grayscale level to be within an allowable range, and the number of the look-up table being one.

According to this arrangement, the target temperature with which the heater control means starts or stops the heating by the heater is a liquid crystal temperature at which each pixel is virtually able to reach a desired grayscale level in every grayscale level transition, even if the grayscale level transition facilitation by the control means is carried out with only one look-up table. Furthermore, the threshold values with which the heater control means starts or stops the heating by the heater are set in such a manner as to keep the difference between a grayscale level at which a pixel reaches as a result of the grayscale level correction by the control means and the target grayscale level to be within an allowable range, even if the grayscale level transition facilitation by the control means is carried out with only one look-up table.

Thus, being different from the control to keep the temperature change to be within the range of ±1° C., it is unnecessary to provide circuits for estimating a temperature and for controlling heating by stages. This prevents the occurrence of an unnecessarily high temperature of the liquid crystal panel, due to, for instance, mis-estimation, and excess brightness caused by this high temperature.

As a result, a liquid crystal display which can improve, irrespective of the ambient temperature, a response speed while restraining the degradation of display quality to be hardly recognizable for the viewer is realized with a simple circuit arrangement.

In addition to the above, the target temperature may be within a range between 33° C. and 63° C. With this, since the target temperature is within a range between 33° C. and 63° C., the temperature of the liquid crystal panel does not go below 30° C. even if the above-mentioned threshold value is set as 3° C. Thus, the occurrence of the excess brightness and poor brightness are prevented without providing the determining circuit and adjusting circuit, and a liquid crystal display which can improve, irrespective of the ambient temperature, a response speed while restraining the degradation of display quality to be hardly recognizable for the viewer is realized with a simple circuit arrangement.

In addition to the above, the allowable range may be such a range that an error between a target brightness and a brightness obtained as a result of the grayscale transition to the current time is not more than ±20%. According to this arrangement, the allowable range is arranged so that an error between a target brightness and a brightness obtained as a result of the grayscale transition to the current time is not more than ±20%, and hence a liquid crystal display with an improved response speed is realized with a simple circuit arrangement. As a result, with a simple circuit arrangement, a liquid crystal display which can improve, irrespective of the ambient temperature, a response speed while restraining the degradation of display quality to be hardly recognizable for the viewer is realized.

Incidentally, when the liquid crystal panel is used in a place where an air temperature is more than 30° C., the target temperature is preferably not less than 48° C. With this, even if the liquid crystal panel is used in such a condition, it is possible to control a temperature of the liquid crystal panel to be within ±3° C. of the target temperature, with a system in which the liquid crystal panel is heated by a heater, and without using a cooling system, naturally cooled by radiation (thermal-conduction) cooling.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display, comprising:
   a memory storing, until a next time, current data indicating current brightness of each pixel provided in a liquid crystal panel;
   a look-up table precedently storing (i) combinations of previous data and the current data, the combinations having possibilities to be inputted, and (ii) output signals corresponding to the respective combinations;
   control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data;
   a heater heating the liquid crystal panel, the heater including a plurality of heater electrodes, each of the plurality of heater electrodes being formed as a linear band aligned to be in parallel with a side of the liquid crystal panel; and
   heater control means for controlling start and stop of heating by the heater, in such a manner as to keep a sensed temperature of the liquid crystal panel to be not more than ±3° C. of a predetermined target temperature which is within a range between 33° C. and 63° C., the sensed temperature of the liquid crystal panel being determined by sensing a temperature of a plurality of separate sections of the liquid crystal panel.

2. The liquid crystal display as defined in claim 1, wherein, a number of the look-up table is one.

3. The liquid crystal display as defined in claim 2, wherein, the target temperature is determined to be within a range between 48° C. and 63° C.

4. The liquid crystal display as defined in claim 1, wherein, the look-up table is arranged so as to correspond to the target temperature.

5. The liquid crystal display as defined in claim 1, wherein, the target temperature is determined to be within a range between 48° C. and 63° C.

6. The liquid crystal display as defined in claim 1, wherein, the liquid crystal panel includes a liquid crystal cell in vertical align mode and is driven in normally black mode.

7. The liquid crystal display as defined in claim 1, wherein, the heater control means controls start and stop of heating by the heater irrespective of ambient temperature.

8. The liquid crystal display as defined in claim 1, wherein the heater control means comprises:
   a plurality of temperature sensors, each of the plurality of temperature sensors being configured to sense the temperature of a separate section of the liquid crystal panel.

9. A liquid crystal display, comprising:
   a memory storing, until a next time, current data indicating current brightness of each pixel provided in a liquid crystal panel;
   a look-up table precedently storing (i) combinations of previous data and the current data, the combinations having possibilities to be inputted, and (ii) output signals corresponding to the respective combinations;
   control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data;
   a heater heating the liquid crystal panel, the heater including a plurality of heater electrodes, each of the plurality of heater electrodes being formed as a linear band aligned to be in parallel with a side of the liquid crystal panel; and
   heater control means for controlling the heater so as to either stop the heating by the heater when a sensed temperature of the liquid crystal panel exceeds a threshold value which is 1° C. through 1.5° C. higher than a target temperature, or start the heating by the heater when the sensed temperature of the liquid crystal panel goes below a threshold value which is 1° C. through 1.5° C. lower than the target temperature, the target temperature being determined in advance to be in a range between 33° C. and 63° C.; wherein
   the sensed temperature of the liquid crystal panel is determined by sensing a temperature of a plurality of separate sections of the liquid crystal panel.

10. The liquid crystal display as defined in claim 9, wherein, a number of the look-up table is one.

11. The liquid crystal display as defined in claim 10, wherein, the target temperature is determined to be within a range between 48° C. and 63° C.

12. The liquid crystal display as defined in claim 9, wherein, the look-up table is arranged so as to correspond to the target temperature.

13. The liquid crystal display as defined in claim 9, wherein, the target temperature is determined to be within a range between 48° C. and 63° C.

14. The liquid crystal display as defined in claim 9, wherein, the liquid crystal panel includes a liquid crystal cell in vertical align mode and is driven in normally black mode.

15. A liquid crystal display, comprising:
   a memory storing, until a next time, current data indicating current brightness of each pixel provided in a liquid crystal panel;
   a look-up table precedently storing (i) combinations of previous data and the current data, the combinations having possibilities to be inputted, and (ii) output signals corresponding to the respective combinations;
   control means for outputting an output signal as corrected current data in order to facilitate grayscale transition from a previous time to a current time, by reading out, from the look-up table, data corresponding to a combination of previous data read out from the memory and current data, and outputting that data or that data after being interpolated, instead of the current data;
   a heater heating the liquid crystal panel, the heater including a plurality of heater electrodes, each of the plurality of heater electrodes being formed as a linear band aligned to be in parallel with a side of the liquid crystal panel; and
   heater control means for controlling start and stop of heating by the heater, in such a manner as to keep a difference between a sensed temperature of the liquid crystal panel and a target temperature to be not more than a predetermined threshold value, the target temperature being a temperature at which, by facilitating the grayscale transition by the control means, each pixel is virtually able to reach a desired grayscale level in every grayscale level transition, the threshold value being set in such a manner as to keep a difference between a grayscale level at which a pixel reaches as a result of the grayscale level correction by the control means and a target grayscale level to be within an allowable range; wherein the sensed temperature of the liquid crystal panel is determined by sensing a temperature of a plurality of separate sections of the liquid crystal panel.

16. The liquid crystal display as defined in claim 15, wherein, a number of the look-up table is one.

17. The liquid crystal display as defined in claim 16, wherein, the target temperature is determined to be within a range between 33° C. and 63° C.

18. The liquid crystal display as defined in claim 16, wherein, the target temperature is determined to be within a range between 48° C. and 63° C.

19. The liquid crystal display as defined in claim 16, wherein, the allowable range is such a range that an error between a target brightness and a brightness obtained as a result of the grayscale transition to the current time is not more than ±20%.

20. The liquid crystal display as defined in claim 15, wherein, the look-up table is arranged so as to correspond to the target temperature.

21. The liquid crystal display as defined in claim 15, wherein, the target temperature is determined to be within a range between 33° C. and 63° C.

22. The liquid crystal display as defined in claim 15, wherein, the target temperature is determined to be within a range between 48° C. and 63° C.

23. The liquid crystal display as defined in claim 15, wherein, the allowable range is such a range that an error between a target brightness and a brightness obtained as a result of the grayscale transition to the current time is not more than ±20%.

24. The liquid crystal display as defined in claim 15, wherein, the liquid crystal panel includes a liquid crystal cell in vertical align mode and is driven in normally black mode.

* * * * *